United States Patent Office 2,817,564
Patented Dec. 24, 1957

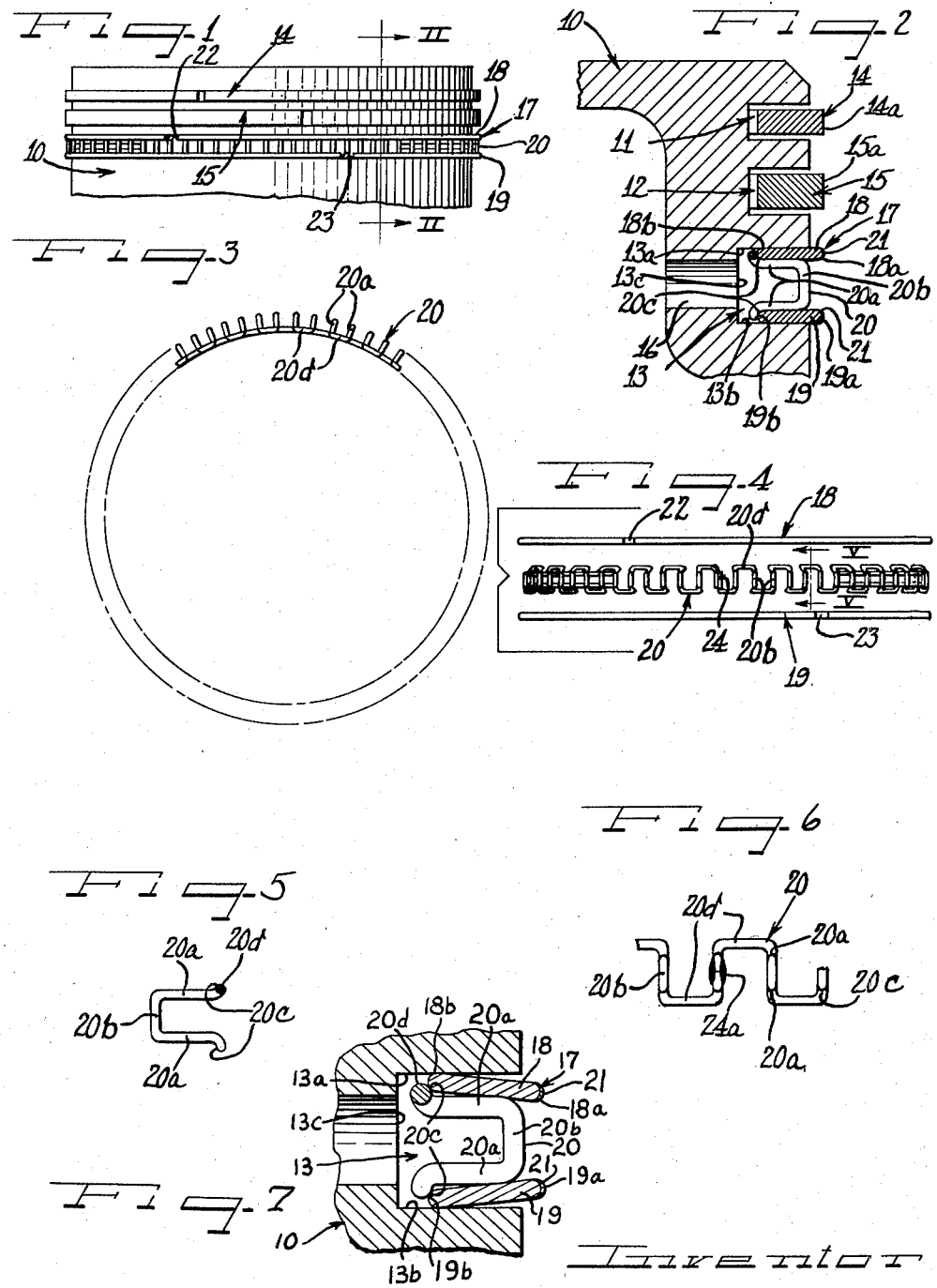

2,817,564

PISTON RING

Melvin W. Marien, Brentwood, Mo., assignor to Ramsey Corporation, a corporation of Ohio Application December 4, 1953, Serial No. 396,168

15 Claims. (Cl. 309—29)

This invention relates to packing ring assemblies having cylinder wall-engaging rings held in operative positions by a combination expander and spacer ring.

Specifically, this invention deals with an oil control piston ring assembly having top and bottom flat thin ring segments or rails and a self-expanding open-type wire ring between and behind the thin rings or rails to space and expand the thin rings or rails.

This invention will hereinafter be specifically described as embodied in a piston ring assembly for pistons of internal combustion engines but it should be understood that the ring assembly of this invention is generally useful as a packing ring to control lubrication of relatively movable parts.

This application is a division of my co-pending United States Patent application, Serial No. 303,465, filed August 9, 1952, entitled "Piston Rings", now U. S Patent No. 2,744,803, issued May 8, 1956.

According to this invention, there is provided a stack of rings including top and bottom flat thin steel ring segments and an intermediate combination expander and spacer ring composed of wire. This intermediate ring extends between and behind the steel rings or rails and is radially compressible and self-expanding to exert equal expansion loads around the entire circumference of each of the thin rings or rails. These rings or rails are preferably provided with chromium-plated rounded outer peripheries to present hard wear-resisting edges to the cylinder wall. The expander and spacer ring is composed of spring-tempered wire bent to have open spaces communicating with the oil vent holes in the piston for controlling drainage of oil between the two thin rings or rails.

An important feature of this invention resides in the provision of a single wire ring having a dual capacity of supporting ring segments or rails in spaced operative position while, at the same time, radially expanding these rings against the cylinder wall .

It is then an object of this invention to provide a packing ring having a plurality of thin flat sealing rings and a single circumferential expander and spacer ring composed of wire and holding the thin rings in spaced relation while urging them outwardly around their entire periphery.

A further object of this invention is to provide a piston ring assembly especially adapted for the oil ring groove of pistons wherein a single spring wire ring acts as both an expander and a spacer.

A further and specific object of this invention is to provide an expansible piston ring composed of spring wire of circular cross-section bent to provide upstanding U-shaped segments alternately connected at their top and bottom ends to form a spring which will develop its own radial expansion force without being bottomed on the ring groove.

Other and further objects of this invention will be apparent to those skilled in the art from the following detailed description of the annexed sheet of drawings which, by way of a preferred example, illustrates one embodiment of this invention.

On the drawings:

Figure 1 is a side elevational view of a piston equipped with an oil ring assembly of this invention.

Figure 2 is an enlarged fragmentary vertical cross-sectional view taken along the line II—II of Figure 1.

Figure 3 is a plan view of the wire expander and spacer ring for the oil control piston ring assembly of this invention.

Figure 4 is an exploded outside peripheral view of the oil control piston ring assembly.

Figure 5 is a transverse cross-sectional view taken along the line V—V of Figure 4.

Figure 6 is a fragmentary outside peripheral view of the end portions of the expander and spacer ring showing the manner in which these ends can be welded together.

Figure 7 is a fragmentary vertical cross-sectional view showing the bottom oil ring groove and oil control ring of Figure 2 on a larger scale and emphasizing the dishing of the rail ring.

As shown on the drawings:

In Figures 1 and 2, the reference numeral 10 designates generally a piston for an internal combustion engine. This piston is equipped with the conventional top ring groove 1, middle ring groove 12, and oil ring groove 13. A conventional split solid cast iron piston ring 14 is mounted in the top groove 11 to provide a compression seal. A conventional split compression ring 15, also of cast iron composition, is seated in the middle groove 12. These rings 14 and 15 have broad cylinder wall-engaging faces 14a and 15a respectively.

The oil ring groove 13 is wider than the grooves 11 and 12 and is joined through oil holes, such as 16, with the interior of the piston. This groove 13 has a top wall 13a and a bottom wall 13b extending radially outward from a vertical back wall 13c which is pierced at intervals by the oil holes 16.

An oil control ring assembly 17 of this invention is mounted in the oil groove 13. This assembly 17 includes a top thin flat ring segment 18, an identical bottom ring segment 19, and an intermediate combination expander and spacer ring 20. The rings 18 and 19 have rounded outer peripheral edges 18a and 19a, each covered with a layer of chromium or other hard corrosion and wear-resisting metal 21 so that the cylinder wall-engaging edges of each ring are reinforced with a hard coating. This coating can be applied by electro-plating, brazing, or in any suitable manner. The inner peripheral edges of the rings 18 and 19 are also rounded at 18b and 19b respectively, but the inner peripheries are not coated with the hard metal.

As shown in Figure 4, the thin ring segments or rails 18 and 19 are split and gaps 22 and 23 are respectively provided between the ends of the rings. These gaps will vary in width even when the rings are in operation on the piston 10 as shown in Figure 1, to permit radial contraction and expansion of the thin rings.

The ring 20, on the other hand, has abutted-together ends 24 as shown in Figure 4. This ring 20, when radially compressed, will contract with a resilient spring-like action to exert an equal outward radial load around its entire periphery. Alternately, if desired, the abutted-together ends 24 of the ring 20, can be welded together as shown at 24a in Figure 6, thereby avoiding any possible installation difficulties arising from improper abutment of the ends. The continuous ring 20, thus formed, can be easily stretched over the head of the piston 10 to snap into the groove 13. As a further alternative, suitable lock joints or connectors could also be used to secure together the ends 24 of the ring 20.

The ring 20 is composed of wire of circular cross-section bent to provide upstanding U-shaped segments alternately connected at their top and bottom ends to form a spring which will develop its own radial expansion force without being bottomed on the ring groove. As shown in Figures 3 to 5, the ring 20 has radially spaced top and bottom parallel legs 20a with axial or vertically extending bight portions or legs 20b joining the legs 20a at their outer periphery. Each leg 20a is outturned at its inner edge to provide shoulders 20c and the offset wire portions then form connecting legs 20d joining the inner ends of the legs 20a. As shown in Figure 2, the bight portions 20b extend between the rings 18 and 19, the top and bottom legs 20a underlie these rings to support them, and the shoulders 20c abut the inner peripheries of the rings to urge them radially outward. The wire spring thus developed, separates the thin ring segments 18 and 19 and holds them against the top and bottom side walls of the ring groove while, at the same time, urging the ring segments radially outward against the cylinder wall in which the piston 11 operates. As shown, the shoulders 20c are inclined axially outwardly and radially inwardly to act on the inner peripheries 18b and to 19b of the rail rings with an expanding force that has an axial vector as well as a radial vector. This, of course, will bias the inner ends of the rings outwardly with more force than occurs along the flat legs so as to move the rails into conical shapes to tightly engage the sides of the ring groove at their inner edges.

In the greatly enlarged view of Figure 7, the conical or dished shapes of the rails 18 and 19 are emphasized to illustrate how the inclined shoulders 20c function in forcing the inner portions of the rails 18b and 19b against the sides 13a and 13b respectively of the oil ring groove 13.

From the above description it will, therefore, be understood that this invention provides a packing ring assembly wherein sealing rings are urged radially outward and are held in separated relation by a self-expanding spring wire ring which does not depend upon engagement with the ring groove to exert its expanding force on the sealing rings. The self-expanding wire ring thus serves a dual function of an expander and a separator in a packing ring assembly. The combination expander and separator wire ring is open around its periphery so as not to impede free drainage of oil in oil ring assemblies. The ring can be made continuous by welding or otherwise securing the ends together and the resulting complete annulus can be stretched over the head of the piston and snapped into the oil ring groove.

It will be understood that modifications and variations may be effected without departing from the scope of the novel concepts of the present invention.

I claim as my invention:

1. A combined expansion and spacer ring for packing assemblies which comprises a ring of wire having a circular cross-section, said wire being bent to provide a series of circumferentially spaced U-shaped segments extending in a radial direction, top and bottom legs connecting the U-shaped segments, and abutments provided by said legs adjacent the inner periphery of the ring to engage their ring segments on the inner peripheries thereof.

2. A piston ring comprising spring wire of circular cross-section bent to form radially spaced top and bottom legs joined by axially extending legs to constitute an open corrugated ring arrangement capable of developing its own radial force without being bottomed on a ring groove.

3. A packing ring assembly comprising top and bottom thin flat rail ring segments having hardened cylinder wall-engaging outer peripheries and opposed flat faces, a spring wire ring of circular cross-section between said ring segments and having U-shaped segments extending in a radial direction engaging the opposed flat faces of the ring segments together with top and bottom legs connecting the U-shaped segments to hold them in spaced apart relationship, and abutments provided by said legs forming shoulders engaging the inner peripheries of said segments.

4. A packing ring assembly especially adapted for oil ring grooves and pistons which comprises top and bottom flat thin ring segments adapted to lie against the top and bottom walls of a ring groove, a combination expander and separator ring lying between and partially behind said thin flat rings, said combination ring being formed of spring wire of circular cross-section and having thin ring-supporting portions with offset inner ends forming shoulders to engage the inner peripheries of the ring segments.

5. A piston ring comprising a spring wire annulus bent to support rings in axially spaced relation in a ring groove and to urge said rings outwardly from the groove without being bottomed in the groove.

6. A spacer and expander piston ring which comprises a spring wire annulus adapted to be compressibly loaded to develop a radial expanding force and having top and bottom legs for carrying piston ring rail segments.

7. A piston ring comprising a spring wire annulus composed of spring wire of small cross-section bent to provide rail ring supporting legs.

8. A piston ring assembly comprising a pair of cylinder-engaging rails, and spacer and expander means including portions bearing at an angle to the rails against the inner peripheries of the rails to cause the rails to dish and to spread the rails apart against the sides of the groove and to force them radially outward, and other portions extending between the rails for holding the rails in axially spaced relation.

9. A piston ring assembly comprising a pair of cylinder-engaging rails, each having a rounded inner peripheral edge, and spacer and expander means for holding the rails in axially spaced relation and bearing against the rounded inner edges of the rails at an angle to each rail to force them radially outward and to cause the rails to dish against the sides of the groove, the round edges of the rails facilitating sliding movement of the rails on said means and sliding movement of the rails on the sides of the groove in expanding.

10. A piston ring assembly comprising a pair of cylinder-engaging rails, each having a tendency to dish, and spacer and expander means for holding the rails in axially spaced relation, said means bearing against the inner peripheries of the rails at an angle thereto to cause the rails to dish toward the sides of the groove at their inner peripheries and to force the rails radilly outward.

11. A piston ring assembly comprising a pair of cylinder-engaging rails, and a combined spacer and expander comprising a circumferentially expansible structure U-shape in radial cross section with the arms of the U extending inwardly and holding the rails in axially spaced relation, said arms being shaped to force the rails radially outward and to cause the rails to dish to force the inner portions of the rails against the sides of the groove.

12. A piston ring assembly comprising a pair of cylinder-engaging rails, and a combined spacer and expander comprising a circumferentially expansible structure U-shape in radial cross section with the arms of the U extending inwardly and holding the rails in axially spaced relation, the inner ends of said arms having outwardly flaring portions bearing against the inner peripheries of the rails to force them radially outward and to cause the rails to dish against the sides of the groove.

13. A piston ring assembly comprising a pair of cylinder-engaging rails, and a combined spacer and expander comprising a circumferentially expansible structure U-shape in radial cross section with the arms of the U extending inwardly and holding the rails in axially spaced relation, said circumferentially expansible structure comprising a plurality of circumferentially spaced web members connected by segments at the inner ends of the arms of the U, said segments having outwardly flaring portions bearing against the inner peripheries of the rails to force them radially outward and to cause the rails to dish against the sides of the groove.

14. A piston ring assembly comprising a cylinder-engaging rail, and positioning and expander means for holding said rail at one side of the groove, said means having portions bearing against the inner periphery of said rail at an angle thereto to force the rail radially outward and to dish the rail toward said side of the groove at the inner periphery of the rail.

15. A piston ring assembly comprising a pair of cylinder-engaging rails, and spacer and expander means for holding the rails in axially spaced relation, said means bearing against the inner peripheries of the rails at an angle which is inclined axially outward and radially inward to exert an expanding force having axially outward as well as radially outward force vectors.

References Cited in the file of this patent

UNITED STATES PATENTS

| | | |
|---|---|---|
| 345,767 | Buckley | July 20, 1886 |
| 1,580,092 | Stuver | Apr. 6, 1926 |
| 1,850,674 | Johnson | Mar. 22, 1932 |
| 2,293,450 | Wilkening | Aug. 18, 1942 |
| 2,635,022 | Shirk | Apr. 14, 1953 |
| 2,695,825 | Estey | Nov. 30, 1954 |